United States Patent
Luo et al.

(10) Patent No.: US 8,379,174 B2
(45) Date of Patent: Feb. 19, 2013

(54) STRUCTURE FOR REFLECTIVE LIQUID CRYSTAL DISPLAY

(75) Inventors: Fang-Chen Luo, Hsinchu (TW); Wei-Chih Chang, Hsinchu Hsien (TW)

(73) Assignee: Au Optronics Corporation, Hsinchu (TW)

( * ) Notice: Subject to any disclaimer, the term of this patent is extended or adjusted under 35 U.S.C. 154(b) by 1468 days.

(21) Appl. No.: 10/065,091

(22) Filed: Sep. 17, 2002

(65) Prior Publication Data

US 2003/0076286 A1  Apr. 24, 2003

(30) Foreign Application Priority Data

Oct. 23, 2001 (TW) ................................ 90126138 A

(51) Int. Cl.
*G02F 1/1335* (2006.01)
(52) U.S. Cl. ...................................................... 349/113
(58) Field of Classification Search .................. 349/113, 349/114, 106
See application file for complete search history.

(56) References Cited

U.S. PATENT DOCUMENTS

| | | | | |
|---|---|---|---|---|
| 5,691,791 A | * | 11/1997 | Nakamura et al. | 349/113 |
| 6,038,008 A | * | 3/2000 | Kim et al. | 349/138 |
| 6,061,111 A | * | 5/2000 | Kataoka et al. | 349/113 |
| 6,122,027 A | * | 9/2000 | Ogawa et al. | 349/113 |
| 6,144,429 A | * | 11/2000 | Nakai et al. | 349/113 |
| 6,373,540 B1 | * | 4/2002 | Munakata | 349/117 |
| 6,597,421 B1 | | 7/2003 | Hatanaka et al. | |
| 6,693,689 B1 | * | 2/2004 | Kim et al. | 349/113 |
| 6,819,379 B2 | * | 11/2004 | Kubo et al. | 349/114 |
| 6,822,708 B2 | * | 11/2004 | Fujino | 349/113 |
| 2002/0054257 A1 | * | 5/2002 | Tanada et al. | 349/113 |
| 2002/0145689 A1 | * | 10/2002 | Kaneko | 349/114 |

\* cited by examiner

*Primary Examiner* — Timothy L Rude
(74) *Attorney, Agent, or Firm* — Jianq Chyun IP Office

(57) ABSTRACT

A liquid crystal display structure includes a first substrate panel, a second substrate panel, and a liquid crystal layer disposed between the first substrate panel and the second substrate panel. Pixel portions are formed by respective electrodes for applying a voltage to the liquid crystal layer. The pixel portions include a transparent substrate panel, an organic insulating layer, a patterned reflective layer, a dielectric layer, a transparent conductive layer and a thin film transistor. The organic insulating layer is formed over the transparent substrate panel. The patterned reflective layer is formed over the organic insulating layer exposing a portion of the organic insulating layer. The dielectric layer is formed over the patterned reflective layer. The dielectric layer has a smooth upper surface. The transparent conductive layer is over the dielectric layer. The transparent conductive layer is connected to the thin film transistor so that the thin film transistor can drive the transparent conductive electrode.

6 Claims, 5 Drawing Sheets

STRUCTURE FOR REFLECTIVE LIQUID
CRYSTAL DISPLAY

CROSS REFERENCES TO RELATED
APPLICATIONS

This application claims the priority benefit of Taiwan application serial no. 90126138, filed Oct. 23, 2001.

BACKGROUND OF INVENTION

1. Field of Invention

The present invention relates to a liquid crystal display (LCD) structure. More particularly, the present invention relates to a reflective and transflective type of liquid crystal display or liquid crystal display structure with excellent legibility and display efficiency.

2. Description of Related Art

In recent years, the applications of liquid crystal display (LCD) are far and wide following full integration with various electronic device packages. Functional capacity and complexity of typical LCD such as liquid crystal monitors and PDAs also expand with time. In general, LCD devices may be categorized into three major types, namely, the reflective type, the transmissive type and the transflective type.

FIG. 1 is a cross-sectional view of one conventional pixel portion of the transflective liquid crystal display device. As shown in FIG. 1, the liquid crystal display device includes an upper glass panel 10a, a lower glass panel 10b, an upper polarizing film 11a, a lower polarizing film 11b, an electrode structure 12, a liquid crystal layer 14, a color filter 16, a transparent conductive layer 20, an organic insulating layer 26, a thin film transistor 28 and a back light system 29. The upper polarizing film 11a is on the upper surface of the upper glass panel 10a and the lower polarizing film 11b is on the lower surface of the lower glass panel 10b. The electrode structure 12, the liquid crystal layer 14, the color filter 16 and the transparent conductive layer 20 are all enclosed within the space between the upper glass panel 10a and the lower glass panel 10b. The electrode structure 12 is composed of a reflective electrode 22 and a transmissive electrode 20. The transmissive electrode 20 can be, for example, an indium-tin-oxide (ITO) layer. The color filter 16 is a layer formed on the interior flat surface of the upper glass panel 10a. Meanwhile, the electrode structure 12 is formed on the interior flat surface of the lower glass panel 10b. The organic insulating layer 26 underneath the reflective electrode 22 has an uneven surface. The surface of the organic insulating layer 26 includes a plurality of protrude/recess structures 26a (or bumps). The thin film transistor (TFT) is formed over the lower glass panel 10b. The thin film transistor 28 includes a gate electrode 28a, a source terminal 28b and a drain terminal 28c. The back lighting system 29 is mounted on the exterior surface of the lower polarizing film 11b.

To increase the efficiency of reflection in FIG. 1, the protrude/recess structure 26a of the organic insulating layer 26 is specially designed to have an undulating surface. Due to the non-planarity of the reflective electrode 22 surface, liquid crystal misalignment and non-uniformity of liquid crystal cell gap inside the pixels can be detrimental to the display performance. Ultimately, quality of the liquid crystal display product is compromised. From FIG. 1, the reflective electrode 22 has an undulating shape and is made of a material having a high light reflection efficiency. When light is emanated from the back light system 29 behind the liquid crystal layer 14, the light passes through the liquid crystal layer 14 only once and exits out from the display surface. When a beam of light incident on the surface of the liquid crystal display from the viewer's side, the light passes through the liquid crystal layer 14 and is reflected by the reflective electrode 22 having the undulating shape, and passes through the liquid crystal layer 14 again to exit from the surface of the liquid crystal display. The light is reflected at various angles due to the undulating shaped reflective electrode 22. The incident/reflection angles are measured with respect to the normal of the transparent substrate 10b (i.e. the line perpendicular to the surface of the transparent substrate 10b) in the plane of 6 o'clock and 12 o'clock. From experimental measurements for an incident light 30° from normal in the 12 o'clock direction, the light beam reflected from the display in a range between 0° and 30° in the 6 o'clock direction is the most effective condition for a viewer. When the reflective angle of the light beam greater or less than this range, the viewing condition is poor for the viewer.

Hence, reflected lights at various angles outside the range are not effective for viewing. The reflected lights at various angles are reflected from various parts of the undulating surface of the reflection electrode. Therefore, if we only utilize the portions of the reflector surface which contributes to the useful reflected lights and convert the nonuseful parts of the reflector into transmissive region by removing the reflectors, the efficiency of the LCD can be significantly improved.

SUMMARY OF INVENTION

Accordingly, one object of the present invention is to provide a liquid crystal display structure capable of minimizing liquid crystal misalignment in the liquid crystal layer and liquid crystal cell gap non-uniformity problem.

A second object of this invention is to provide a liquid crystal display structure having excellent legibility and display efficiency under any surrounding lighting levels.

A third object of this invention is to provide a liquid crystal display structure having much better legibility and display efficiency under any lighting levels and less misalignment in a liquid crystal layer and reduced liquid crystal cell gap non-uniformity problems.

To achieve these and other advantages and in accordance with the purposes of the invention, as embodied and broadly described herein, the invention provides three liquid crystal display (LCD) structures which can improve the viewing performances of the LCDs.

The first LCD structure is a reflective type of liquid crystal display. One pixel portion of the first LCD structure includes a first substrate panel, an organic insulating layer, a conformal reflection layer, a dielectric layer, a first transparent conductive layer, a thin film transistor, a second substrate panel, a second transparent conductive layer and a liquid crystal layer.

The first substrate panel, for example, can be a transparent glass panel. The organic insulating layer is formed over the first substrate panel and made from a material such as acrylic resin, photosensitive resin, polyimide, polymer or BCB. The surface of the organic insulating layer has a plurality of protrude/recess structures or bumps. The conformal reflection layer is formed over the organic insulating layer and made from a highly reflective metallic material such as aluminum or silver or a highly reflective non-metallic material. The conformal reflection layer serves as a non-planar reflecting surface due to the presence of the protrude/recess structures or bumps. The dielectric layer is formed over the conformal reflection layer. The dielectric layer may have a planar surface or a surface having a planarity much better than the surface containing the bumpy structures for planarizing the metallic reflection layer. Furthermore, the dielectric layer may be a color filter capable of replacing the color filter close to the upper glass panel. If the dielectric layer is a transparent insulating layer, the color filter close to the upper glass panel may still be used. The first transparent conductive layer is formed over the dielectric layer. The first transparent conductive layer serves as an electrode. The thin film transistor is formed over the first substrate. The thin film transistor has a gate electrode, a source terminal and a drain terminal. The first transparent conductive layer electrode is connected to the thin film transistor so that the thin film transistor may drive the first transparent conductive layer electrode. The second substrate panel is aligned to the first substrate panel. The second transparent conductive layer is formed on the lower surface of the second substrate panel. The liquid crystal layer is sandwiched between the second transparent conductive layer and the first transparent conductive layer.

Since a material film having a non-planar surface is an essential aspect of the LCD structure but may lead to liquid crystal misalignment and liquid crystal cell gap non-uniformity problems, a dielectric layer having a relatively planar upper surface is formed over the material film. The dielectric layer can be a color filter layer or a transparent insulating layer. A transparent conductive layer is later formed over the dielectric layer. With this structural arrangement, the liquid crystal layer has a uniform thickness throughout and hence problems caused by having a non-planar reflection layer are avoided.

To achieve these and other advantages and in accordance with the purpose of the invention, as embodied and broadly described herein, the invention provides a liquid crystal display (LCD) structure, which utilizes the portions of the reflector surface which contributes to the useful reflected lights and convert the nonuseful parts of the reflector into transmissive region by removing the reflectors, the efficiency of the LCD can be significantly improved. The LCD structure is a transflective (transmissive/reflective) type of liquid crystal display. One pixel portion of the second LCD structure includes a first substrate panel, an organic insulating layer, a plurality of conformal transparent conductors, a plurality of conformal reflectors, a thin film transistor, a second substrate panel, a second transparent conductive layer, a color filter layer, a liquid crystal layer and a back lighting system.

The first substrate panel, for example, can be a transparent glass panel. The organic insulating layer is formed over the first substrate panel and made from a material such as acrylic resin, photosensitive resin, polyimide, polymer or BCB. The surface of the organic insulating layer has a plurality of protrude/recess structures or bumps. Each protrude/recess structure can be divided into two regions, a first region and a second region, according to the preferable viewing angle for reflection. The first region is an area for forming the reflection layer and the second region is an area for forming the transmissive layer. The first region and the second region are alternately laid. The conformal transparent conductors are formed over a portion of the organic insulation layer. The plurality of reflectors is formed over the organic insulating layer and/or the conformal transparent conductors. The reflectors expose a portion of the conformal transparent conductors. The transparent conductors and the reflectors are alternately laid with some regions overlapped, thereby forming a continuous electrical connection. Materials constituting the reflectors include highly reflective metallic materials such as aluminum or silver. Each reflector covers at least a portion of the first region. There is no metallic material over the second region and hence exposes the transparent conductors. Such exposed transparent conductors occupy roughly 1% to 60% of the overall area of the organic insulating layer. Thus, the reflectors serve as reflective electrodes while the transparent conductors serve as transmissive electrodes. The reflectors are constructed, for example, by forming a patterned reflective layer over the conformal transparent conductive patches or directly forming on the organic insulating layer. Alternatively, the reflectors are constructed by forming the patterned reflective layer over a portion of the organic insulating layer and a portion of the transparent conductors. To reduce electrochemical reaction due to direct contact between the transparent conductors and the aluminum or silver reflectors, a buffering layer, such as a molybdenum layer, may be introduced into the interface between the transparent conductors and the reflectors. The thin film transistor is formed over the first substrate. The thin film transistor has a gate electrode, a source terminal and a drain terminal. The transmissive electrode or the reflective electrode is connected to the thin film transistor so that the thin film transistor may drive the display electrodes. The second transparent conductive layer is formed on the lower surface of the second substrate panel. The color filter layer is formed over the second substrate panel and the second transparent conductive layer is formed over the color filter layer. The liquid crystal layer is sandwiched between the second transparent conductive layer and the first substrate panel. The back lighting system is mounted outside the first substrate panel facing the other side of the second substrate panel. A portion of the light emitted from the back lighting system passes through the transmissive electrode while another portion of the light reflects back from the reflective electrode and is re-used.

The division into a first region and a second region is based preferably according to the following relationship: for an incoming beam of light impinging at negative 30° to the normal (12 o'clock direction) of the surface of a reflection layer with protrude/recess structures, reflected light having a viewing angle between 0° to 30° are most suitable for a human observer (an angle measured from a normal line perpendicular to the panel, 6 o'clock direction). This portion having an angular range that corresponds with the protrude/recess structures defines the first region. When the distribution of reflected light falls upon other viewing range so that human eyes are difficult to observe, this portion having a viewing angle that corresponds to the protrude/recess structures defines the second region.

This invention also provides a third liquid crystal display (LCD) structure. The third LCD structure is a transflective (transmissive/reflective) type of liquid crystal display. The third LCD structure includes a first substrate panel, an organic insulating layer, a reflective block layer, a dielectric layer, a first transparent conductive layer, a thin film transistor, a second substrate panel, a second transparent conductive layer, a color filter layer, a liquid crystal layer and a back lighting system.

The first substrate panel, for example, can be a transparent glass panel. The organic insulating layer is formed over the first substrate panel and made from a material such as acrylic resin, photosensitive resin, polyimide, polymer or BCB. The surface of the organic insulating layer has a plurality of protrude/recess structures or bumps. Each protrude/recess structure can be divided into two regions, a first region and a second region, according to the viewing angle. The plurality of reflectors is formed over the organic insulating layer so that a portion of the organic insulating layer is exposed. The reflectors are made using a highly reflective metallic material such as aluminum or silver or a highly reflective non-metallic material. Each reflective block covers at least a portion of the first region. There are no reflectors over the second region and hence exposes the organic insulating layer. Such exposed organic insulating layer occupies roughly 1% to 60% of the overall area of the transparent conductive layer. Thus, the reflectors serve as reflective regions while the exposed organic insulating layer serves as transmissive regions. The reflectors are constructed, for example, by forming a patterned reflective layer over the organic insulating layer. The dielectric layer such as a color filter layer or a transparent insulating material layer is formed over the reflectors and the exposed organic insulating layer. The dielectric layer has a surface with a higher degree of planarity than the surface of the original protrude/recess structures, thereby smooth out the transflective layer. The first transparent conductive layer is formed over the dielectric layer. The thin film transistor is formed over the first substrate. The thin film transistor has a gate electrode, a source terminal and a drain terminal. The first transparent conductive layer is connected to the thin film transistor so that the thin film transistor may drive the first transparent conductive layer. The second substrate panel is aligned to the first substrate panel. The color filter layer is formed over the second substrate panel (if the dielectric layer has color filtering capability, this color filter layer may be omitted). The second transparent conductive layer is formed over the second substrate panel or the color filter layer, if present. The liquid crystal layer is sandwiched between the second transparent conductive layer and the first transparent conductive layer. The back lighting system is mounted on the first substrate panel facing the other side of the second substrate panel. A portion of the light emitted from the back lighting system penetrates the transmissive electrode while another portion of the light reflects back from the reflective electrode and is re-used.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
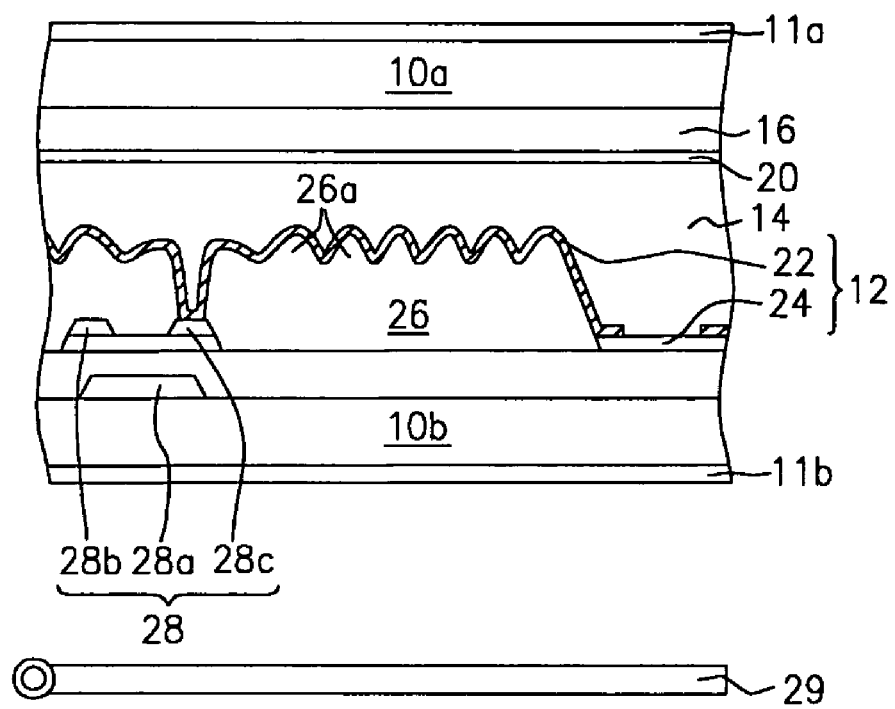
FIG. 1 is a cross-sectional view of a conventional liquid crystal display device.

Reference will now be made in detail to the present preferred embodiments of the invention, examples of which are illustrated in the accompanying drawings. Wherever possible, the same reference numbers are used in the drawings and the description to refer to the same or like parts.

Figure 2:
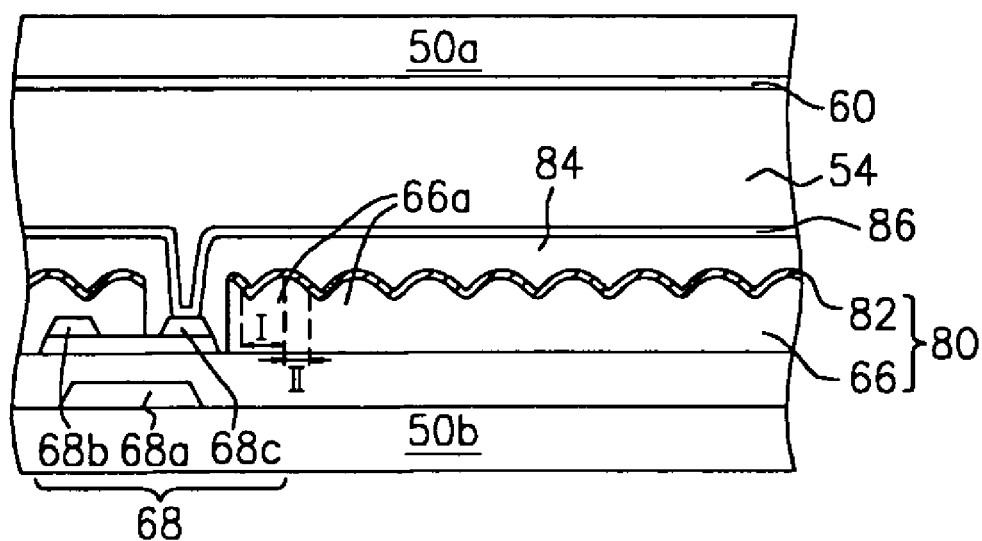
FIG. 2 is a schematic cross-sectional view showing a first type of one pixel portion of a liquid crystal display structure according to a first preferred embodiment of the invention.

FIG. 2 is a schematic cross-sectional view showing a first type of one pixel portion of a liquid crystal display structure according to a first preferred embodiment of this invention. A first glass panel or a first substrate panel 50b and a second glass panel or a second substrate panel 50a (the first glass panel 50b is the lower glass panel and the second glass panel 50b is the upper glass panel) are provided. The first glass panel 50b and the second glass panel 50a together enclose all the component layers, including layers such as a liquid crystal layer 54 and a color filter layer 84, of a liquid crystal display (LCD). A quarter wave plate, a phase compensation plate and a polarizer composed of a group of polarizing panels (not shown in FIG. 2) are attached to the opposite side of the second glass panel 50a with the liquid crystal layer 54. An organic insulating layer 66 is formed over the first substrate panel 50b. A dielectric layer may also form between the organic insulating layer 66 and the first substrate board 50b. The organic insulating layer 66 is made from a material including, for example, acrylic resin, photosensitive resin, polyimide, polymer or BCB. The upper surface of the organic insulating layer 66 has a plurality of protrude/recess structures 66a or bumps. A conformal reflective layer 82 is formed over the organic insulating layer 66. The conformal reflective layer 82 is made from a highly reflective material including, for example, aluminum or silver. The conformal reflective layer 82 serves as a light reflection layer. However, due to the presence of bumps 66a underneath, the conformal reflective layer 82 has a non-planar surface. The color filter layer 84 is formed over the conformal reflective layer 82. The color filter layer 84 has a planar upper surface, thereby smoothing out the underlying conformal reflective layer 82. A first transparent conductive layer 86 is formed over the color filter layer 84. The LCD structure further includes a thin film transistor 68 above the first substrate panel 50b. The thin film transistor 68 has a gate electrode 68a, a source terminal 68b and a drain terminal 68c. The first transparent conductive layer 86 is connected to the thin film transistor 68 so that the thin film transistor 68 may drive the first transparent conductive layer 86. The second substrate panel 50a is above and parallel to the first substrate panel 50b. A second transparent conductive layer 60 is formed under the second substrate panel 50a. Finally, the liquid crystal layer 54 is formed between the second transparent conductive layer 60 and the first transparent conductive layer 86.

In a slightly different version of this embodiment, a transparent insulating material layer (not shown) may replace the color filter layer 84. In this case, another color filter layer needs to be inserted between the second substrate panel 50a and the second transparent conductive layer 60.

Figure 3:
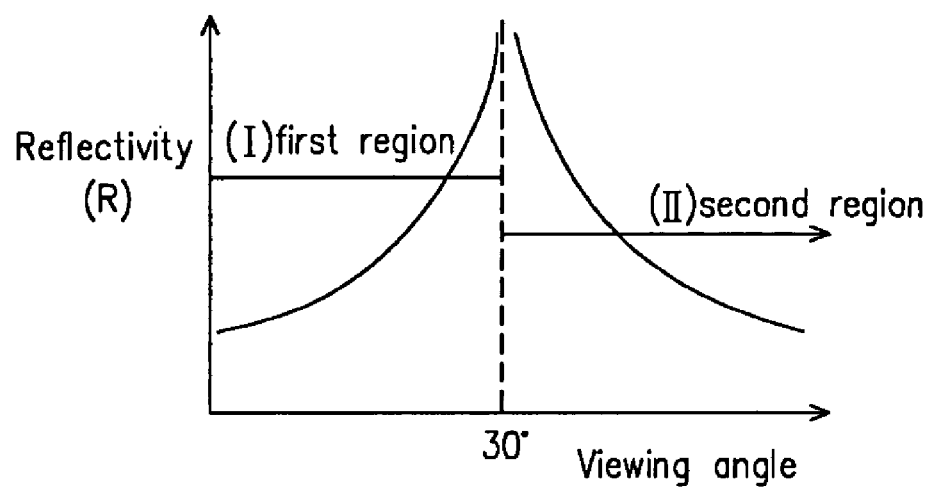
FIG. 3 is a graph showing the relationship between reflectivity (R) and viewing angle for a conventional reflective liquid crystal display.

In small portable reflective liquid crystal display products, users may adjust their viewing angle and prevent the eyes from gazing into surface glare. FIG. 3 is a graph showing the relationship between reflectivity (R) and viewing angle for a reflective liquid crystal display. For incoming light beam impinging at the liquid crystal display panel at −30° from normal at 12 o'clock direction, the reflected lights can be divided into two regions. For example, the angular range from 0° to 30° from normal (at 6 o'clock direction) may be regarded as a normal usable range (I) or "the first region" and angular range from 30° to 90° may be regarded as a rarely used range (II) or "the second region". Obviously, the aforementioned setting of viewing angle 0° to 30° to "the first region" and viewing angle 30° to 90° as "the second region" is an approximation. In reality, the decision of the normal operating range often depends on the incoming light source, the background lighting conditions and the influence of the optimum reflection/transmission for the device.

Figure 4:
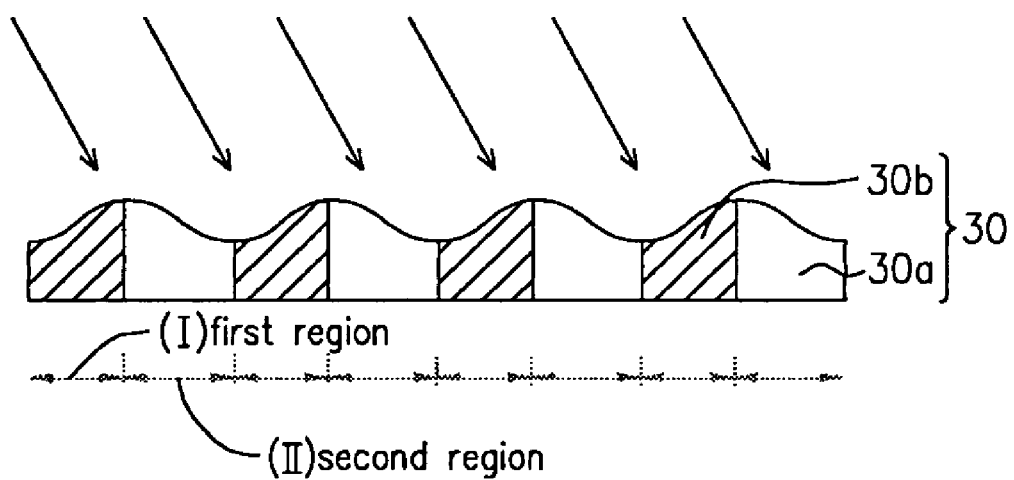
FIG. 4 is a cross-sectional view showing a preferred embodiment of a microscopic structure of the transflective film inside the liquid crystal structure shown in FIG. 2.

The aforementioned analysis may be applied to the fabrication of micro-structural layer within the LCD panel. FIG. 4 is a cross-sectional view showing a preferred embodiment of a microscopic structure of the transflective film 30 inside the liquid crystal structure shown in FIG. 4. The transflective film 30 is divided into (I) first regions 30b and (II) second regions 30a. When a beam of light impinges upon the surface of a LCD panel at an angle, the reflected light that belongs to (I) the first regions 30b will fall upon viewing angular range 0° to 30° of "the first region". On the other hand, the reflected light that belongs to (II) the second regions 30a will fall upon viewing angular range 30° to 90°. This method of dividing area into regions according to the viewing angle can be applied to a transflective type of liquid crystal displays.

Figure 5:
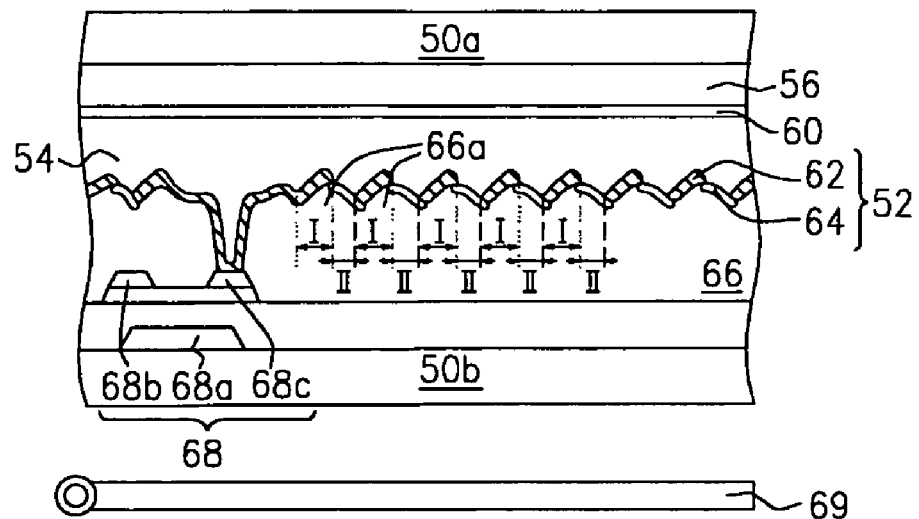
FIGS. 5 and 6 are schematic cross-sectional view and top view of a second type of one pixel portion of a liquid crystal display structure according to a second preferred embodiment of the invention.
Figure 6:
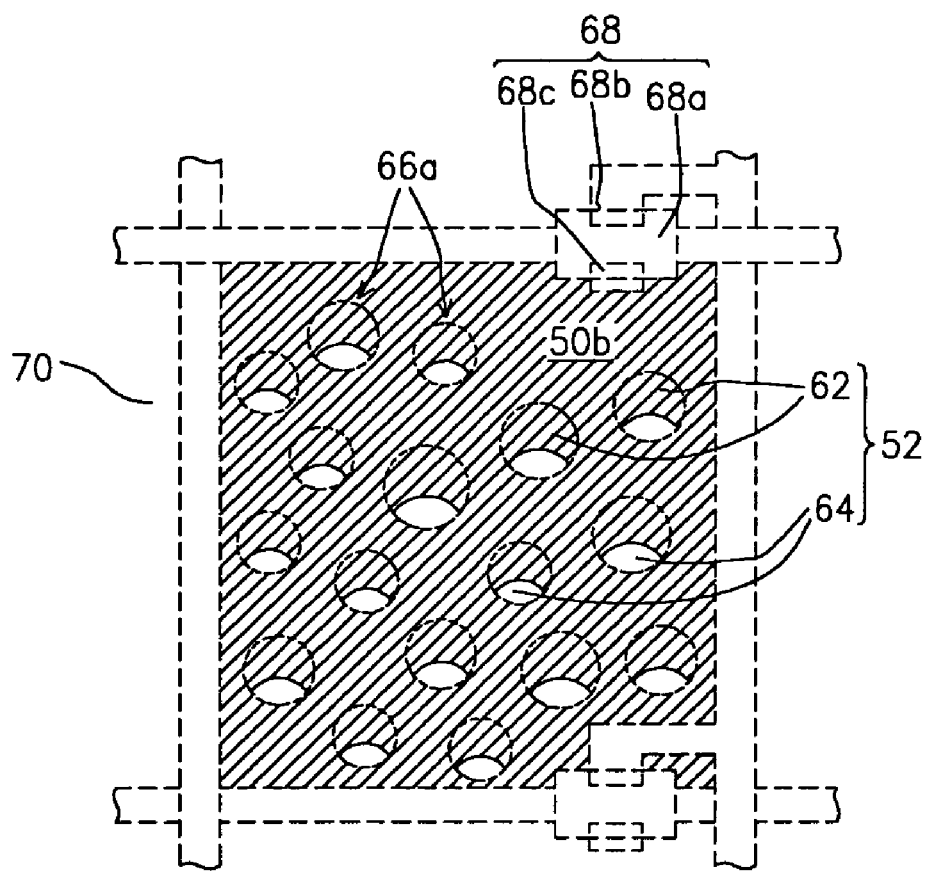

FIGS. 5 and 6 are schematic cross-sectional view and top view of a second type of one pixel portion of the liquid crystal display structure according to a second preferred embodiment of this invention. As shown in FIG. 5, a first glass panel 50b or a lower glass panel and a second glass panel 50a or an upper glass panel are provided. The first glass panel 50b and the second glass panel 50a together encloses all the internal layers of the liquid crystal display, for example, a transflective film 52, a liquid crystal layer 54 and a color filter layer 56. A quarter wave plate, a phase compensation plate and a polarizer plate composed of a group of polarizing films (not shown in FIG. 5) may be attached to the external facing sides of the first glass panel 50b and the second glass panel 50a away from the liquid crystal layer 54. An organic insulating layer 66 is formed over the first substrate panel 50b. A dielectric layer may also be formed between the organic insulating layer 66 and the first substrate board 50b. The pixel portion of the LCD structure further includes a thin film transistor 68 above the first substrate panel 50b. The thin film transistor 68 has a gate electrode 68a, a source terminal 68b and a drain terminal 68c.

The organic insulating layer 66 is made from a material including, for example, acrylic resin, photosensitive resin, polyimide, polymer or BCB. The upper surface of the organic insulating layer 66 further includes a plurality of protrude/recess structures 66a or bumps. Each protrude/recess structure 66a may be further sub-divided onto two different regions, including a first region (I) and a second region (II). For the purpose of improving efficiency of the LCD structure, the first region of the protrude/recess structure 66a is used to contribute to the useful reflected lights and the second region of the protrude/recess structure 66a is converted into a transmissive region by removing the reflectors. Alternatively, portions of the first region and the second region can be formed by first forming a transparent conductive layer over the entire protrude/recess structure 66a and then patterning reflective electrodes over region I to form a region contributing to the useful reflected lights. The region contributing to the useful reflected lights is the first region and the remaining exposed transparent conductive layer region is the second region. In another way, a conformal transparent conductive layer 64 can be formed at least over a portion of the organic insulating layer 66 to constitute the second region. A plurality of reflectors 62 are formed over the organic insulating layer 66 and/or over parts of the conformal transparent conductive layer 64 (as shown in FIG. 5 of the preferred embodiment, the reflectors 62 are formed over the conformal transparent conductive layer 64, for example.) such that a portion of the conformal transparent conductive layer 64 is exposed. Alternatively, the reflectors 62 can also be formed directly on portions of the undulating surface of the organic insulating layer 66 to form the first region and the conformal transparent conductive layer 64 can also be formed on remaining portions of the surface of the organic insulating layer 66 to form the second region. Either the reflectors 62 or the transparent conductive layer 64, or both, is/are connected to the thin film transistor 68 so that the thin film transistor 68 may drive the reflectors 62 and/or the transparent conductive layer 64.

The exposed transparent conductive layer 64 and the reflectors 62 are formed in an alternating array. The transparent conductive layer 64 and the reflectors 62 are arranged in such that some regions are overlapped (in FIG. 5, overlapping between the two is shown) to form a continuous electrically connected layer. The reflectors 62 are made from a highly reflective material such as aluminum or silver. To reduce electrochemical reaction due to direct contact between the transparent conductive layer 64 and the aluminum or silver reflectors 62, a buffer conductive layer (not shown), such as a molybdenum layer, may be introduced as an interface formed between the transparent conductive layer 64 and the reflectors 62. The exposed conformal transparent conductive layer 64 is roughly about 1% to 60% of the protrude/recess structure 66a occupied area. For example, each reflector 62 covers at least a portion of the first region (I) while the second region (II) is free of the reflectors 62, and hence the transparent conductive layer 64 is exposed. Thus, the reflectors 62 serve as reflective electrodes, and the transparent conductors 64 serve as a transmissive electrodes. The transmission layer (the first transparent conductors 64) or the reflective electrodes, or both, are connected to the thin film transistor 68 so that the thin film transistor 68 may drive both the first transparent conductive layer 64 and the reflective electrodes 62. The second substrate panel 50a is above and parallel to the first substrate panel 50b. The LCD structure also includes the color filter layer 56 formed over the second glass panel 50a. A second transparent conductive layer 60 is formed over the color filter layer 56. The liquid crystal layer 54 is formed between the second transparent conductive layer 60 and the first transparent conductive layer 50b. The LCD structure also has a back lighting system 69 attached to the other side of the first glass panel 50b opposite the second glass panel 50a. A portion of the light beam emitted from the back lighting system 69 passes through the transmission electrode 64. The remaining portion of the light is reflected back for re-use via the reflective electrode 62.

Furthermore, the following method may be used to divide the transflective layer into a first region (I) and a second region (II). Assume an incoming beam of light impinges upon the surface of a reflective layer fully covered with protrude/recess structures 66a. If the range of the reflected light falls within an angle between 0° to 30° or the viewing angle for best human observation, the portion of the protrude/recess structures 66a corresponding to such viewing angular range is defined as "the first region" (I). On the other hand, if the reflected light falls within an angle between 30° to 90° or the worst viewing angle for human observer, the portion of the protrude/recess structures 66a corresponding to such viewing angular range is defined as "the second region" (II). Obviously, the aforementioned setting of viewing angle 0° to 30° to "the first region" and viewing angle 30° to 90° as "the second region" is quite arbitrary. In reality, the decision of the normal operating range often depends on the incoming light source, the background lighting conditions and the optimum reflection/transmission relationship.

As shown in FIG. 5, inside each liquid display pixel 70, the protrude/recess structures 66a have different shape and size distribution on the first glass panel 50b. Furthermore, each protrude/recess structure 66a is divided into first region (I)

and second region (II) according to the viewing direction. The first regions (I) of the protrude/recess structures 66a are areas where the reflectors 62 (the reflective layer) are located. Similarly, the second regions (II) of the protrude/recess structures 66a are areas where the exposed transparent conductive layer 64 (the transmission layer) are located. The two together constitute a transflective film 52. In addition, a thin film transistor 68 that includes a gate electrode 68a, a source terminal 68b and a drain terminal 68c is formed on one edge the liquid crystal pixel 70.

The invention also provides a liquid crystal display structure having a color filter layer above the reflective layer and the transmission layer, and the color filter layer has a planar surface. Aside from having excellent legibility and display efficiency, the LCD structure is able to minimize liquid crystal misalignment caused by an uneven reflective layer.

Figure 7:
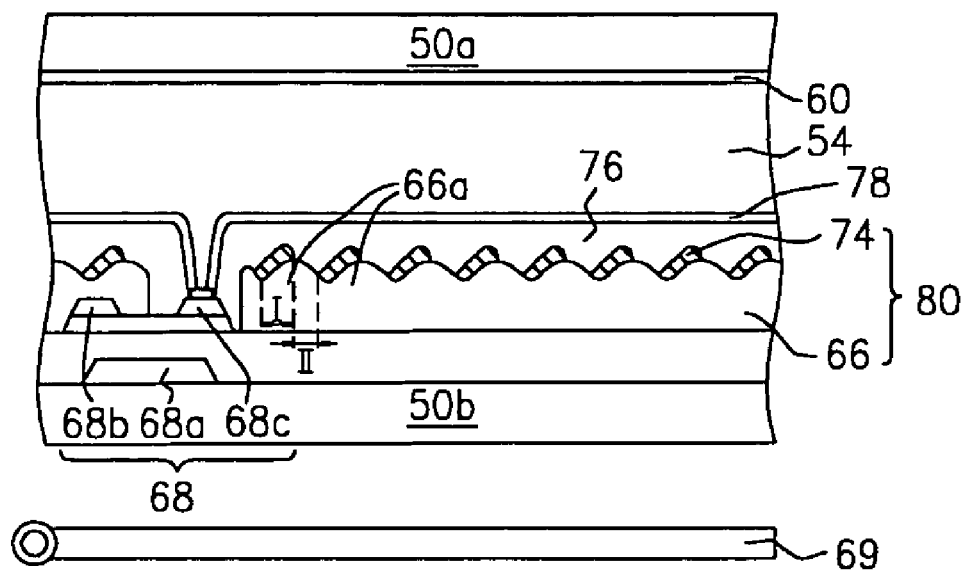
FIG. 7 is a schematic cross-sectional view showing a third type of one pixel portion of a liquid crystal display structure according to a third preferred embodiment of the invention.

FIG. 7 is a schematic cross-sectional view showing a third type of one pixel portion of a liquid crystal display structure according to a third preferred embodiment of the invention. In FIG. 7, components identical to the ones in FIG. 5 are labeled identically. As shown in FIG. 7, a first glass panel 50b or a lower glass panel and a second glass panel 50a or an upper glass panel are provided. The first glass panel 50b and the second glass panel 50a together enclose all the internal layers of the liquid crystal display, for example, a transflective structure 80, a liquid crystal layer 54 and a color filter layer 76. A quarter wave plate, a phase compensation plate, and a polarizer composed of a group of polarizing panels (not shown in FIG. 5) may be attached to the external facing sides of the first glass panel 50b and the second glass panel 50a away from the liquid crystal layer 54. An organic insulating layer 66 is formed over the first substrate panel 50b. A dielectric layer may also exist between the organic insulating layer 66 and the first substrate board 50b. The organic insulating layer 66 is made from a material including, for example, acrylic resin, photosensitive resin, polyimide, polymer or BCB. The upper surface of the organic insulating layer 66 further includes a plurality of protrude/recess structures 66a or bumps. Each protrude/recess structure 66a may be further sub-divided onto two different regions, including a first region (I) and a second region (II). A plurality of reflectors 74 is formed over the organic insulating layer 66 such that a portion of the organic insulating layer 66 is exposed. The reflectors 74 are made from a highly reflective material such as aluminum or silver. The exposed organic insulating layer 66 is roughly about 1% to 60% of the protrude/recess structure 66a area. For example, each reflector 74 covers at least a portion of the first region (I) while the second region (II) is free of the reflectors 74 and hence exposes the organic insulating layer 66. Thus, the reflectors 74 serve as reflective regions, and the organic insulating layer 66 serve as transmission regions. The reflectors 74 and the organic insulating layer 66 together form the transflective layer 80. The color filter film 76 is formed over the reflectors 74 and the exposed organic insulating layer 66. The color filter layer 76 has a smooth upper surface and hence evening out the undulating surface of the protrude/recess structures 66a. An insulating material layer may replace the color filter layer 76. A transparent conductive layer 78 is formed over the color filter layer 76 to serve as an electrode. The LCD structure further includes a thin film transistor 68 above the first substrate panel 50b. The thin film transistor 68 has a gate electrode 68a, a source terminal 68b and a drain terminal 68c. The transparent conductive layer 78 is electrically connected to the drain electrode 68c through a via hole. In addition, a second transparent conductive layer 60 is formed over the second substrate panel 50a. The liquid crystal layer 54 is formed between the first transparent conductive layer 78 and the second transparent conductive layer 60. The LCD structure also has a back lighting system 69 attached to the other side of the first glass panel 50b opposite the second glass panel 50a. A portion of the light emitted from the back lighting system 69 penetrates through the transmission layer 66. The remaining portion of the light is reflected back for re-use via the reflective layer 74. In a slight variation of the embodiment, a transparent insulating material layer (not shown) may replace the color filter layer 76. In such case, another color filter film is needed between the second substrate panel 50a and the second transparent conductive layer 60.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A liquid crystal display (LCD) structure, comprising a first substrate panel, a second substrate panel, and a liquid crystal layer disposed between the first substrate panel and the second substrate panel, a plurality of pixel portions being formed by respective electrodes for applying a voltage to the liquid crystal layer, each of the pixel portions comprising:
   an organic insulating layer over the first substrate panel, wherein the organic insulating layer comprises a bumpy surface;
   a conformal reflective layer over the bumpy surface of the organic insulating layer;
   a planar color filter layer over the conformal reflective layer, wherein the planar color filter layer has a substantially planar upper surface and a bottom surface that conformably covers the conformal reflective layer;
   a contact via configured in the planar color filter layer, the conformal reflective layer and the organic insulating film;
   a first transparent conductive layer over the planar color filter layer, wherein the first transparent conductive layer is connected to a thin film transistor through the contact via in the planar color filter layer, the conformal reflective layer and the organic insulating film, and a first terminal of the thin film transistor is configured in the planar color filter layer while a second terminal of the thin film transistor is configured in the organic insulating layer.

2. The LCD structure of claim 1, wherein the first substrate panel includes a glass panel.

3. The LCD structure of claim 1, wherein the material forming the organic insulating layer includes an acrylic resin.

4. The LCD structure of claim 1, wherein the material forming the organic insulating layer includes a photosensitive resin.

5. The LCD structure of claim 1, wherein a material for forming the conformal reflective layer includes aluminum or silver or a reflective non-conducting material.

6. The LCD structure of claim 1, wherein a surface of the second substrate panel on the opposite side of the liquid crystal layer further includes a phase compensation plate and a polarizer.

* * * * *